United States Patent [19]

Mundt

[11] 4,054,943
[45] Oct. 18, 1977

[54] CIRCUIT ARRANGEMENT FOR THE AUTOMATIC DE-EXCITATION OF A HYSTERESIS MOTOR

[75] Inventor: Johann Mundt, Julich-Koslar, Germany

[73] Assignee: URANIT Uran-Isotopentrennungs-GmbH, Julich, Germany

[21] Appl. No.: 703,118

[22] Filed: July 6, 1976

[30] Foreign Application Priority Data

July 5, 1975 Germany .......................... 2530112

[51] Int. Cl.² .............................................. H02P 3/18
[52] U.S. Cl. .................... 318/166; 318/170; 318/180
[58] Field of Search .............. 318/166, 200, 170, 180; 361/149

[56] References Cited

U.S. PATENT DOCUMENTS

| | | | |
|---|---|---|---|
| 2,436,302 | 2/1948 | Hyde et al. ........................ | 318/200 |
| 2,586,095 | 2/1952 | Roters .................................. | 318/166 |
| 3,159,244 | 12/1964 | Anderson ........................ | 361/149 X |
| 3,463,986 | 8/1969 | Curriston et al. ................ | 318/166 |
| 3,667,013 | 5/1972 | Bicking .............................. | 318/166 |

*Primary Examiner*—Gene Z. Rubinson
*Attorney, Agent, or Firm*—Spencer & Kaye

[57] ABSTRACT

A circuit arrangement for the automatic de-excitation of a hysteresis motor whose reactive power intake is compensated by capacitors and whose stator windings, which are fed from a three phase mains via a frequency converter, magnetize the rotor with their rotating field and thus produce a permanently magnetic excitation which continues in the rotor in the form of residual magnetic poles even after disconnection of the motor from the three phase mains. A voltage monitor monitors the mains side input to the frequency converter and responds upon interruption of the mains voltage due to malfunction or end of operation. Upon interruption of the mains voltage a capacitor of a buffer circuit in the d.c. intermediate circuit of the frequency converter transfers its stored energy, with decaying voltage, to the stator of the motor via an inverter which forms the output of the frequency converter, and upon response of the voltage monitor, the output frequency $f_0$ of the inverter is automatically increased by a predetermined amount $\Delta f$, whereby the residual magnetism in the rotor is quenched.

4 Claims, 3 Drawing Figures

CIRCUIT ARRANGEMENT FOR THE AUTOMATIC DE-EXCITATION OF A HYSTERESIS MOTOR

BACKGROUND OF THE INVENTION

The present invention relates to a circuit arrangement for the automatic de-excitation of a hysteresis motor whose reactive power intake is compensated by capacitors and whose stator winding, which is fed from a three phase mains via a frequency converter, magnetizes, with its rotating field, the rotor made of ferromagnetic material so as to produce a permanently magnetic excitation which remains in existence in the rotor in the form of residual magnetic poles even after the motor is disconnected from the three phase mains.

The rotor of a hysteresis motor is made of ferromagnetic material with defined hysteretic properties. During standard synchronous operation the hysteresis motor behaves similarly to a synchronous machine in greatly underexcited operation. However, whereas in the synchronous machine the excitation field is generated by an excitation coil to which a direct voltage is applied, in the hysteresis motor the rotating field of the stator produces permanently magnetic poles in the, for example, disc-shaped rotor, with the field intensity of these poles being less than that of the excitation field produced by the direct current windings in the synchronous machine.

The excitation of the rotor of a hysteresis motor cannot be switched off without difficulty, i.e., it remains in existence in the rotor in the form of residual magnetic poles even after the motor has been disconnected from the three phase mains.

Another property of the hysteresis motor is its unfavorable power factor (cos $\phi \approx 0.3$) which in systems comprising a plurality of such motors leads to a considerable reactive power load on the three phase current supply mains. For that reason, compensating capacitors are provided to effect an exchange of reactive power within the system including the motor and the capacitor, and the three phase mains covers only the requirement for actual operating power. If the capacitance of the compensating capacitor at operating frequency is matched so that the reactances of the motor and of the capacitor have the same value, the mains carries the load of a matched parallel resonant circuit which is attenuated only by the motor losses and by the actual power transferred to the shaft. If the system including the motor and the capacitor is disconnected from the mains, the motor, whose EMF remains in effect, is driven by its inertial mass and operates as a generator and the parallel resonant circuit fed from the mains becomes a weakly attenuated series resonant circuit at the EMF of the motor. The generated current, which is limited by the active resistance, causes the rotor to be magnetized more strongly and increases the EMF which again drives a higher current through the series resonant circuit until, within a few milliseconds, motor current and terminal voltage reach a multiple of their operating values. This process of self-excitation must be avoided under all circumstances since it is not only a danger to the energy supply devices in the form of excess voltage and current loads, but can also lead to destruction of the motor due to the increased load on the bearings.

It is known to employ a voltage monitor to monitor the motor voltage at a central location of the energy supply system and to short-circuit the motor terminals and thus also the terminals of the compensating capacitors when such a malfunction occurs. This does eliminate the series resonance conditions but the motor rotor is only partially de-excited so that upon elimination of the short-circuit the self-excitation process may start up again due to residual magnetization of the rotor. It is therefore necessary to de-excite hysteresis motors as completely as possible. Even if operating conditions require disconnection of the motor, it should be attempted to obtain as complete a de-excitation as possible since the re-connection of excited hysteresis motors to static frequency converters is difficult.

SUMMARY OF THE INVENTION

It is the object of the present invention to provide a circuit arrangement which makes it possible, when motors with permanently magnetic excitation, i.e., hysteresis motors which are connected to capacitors for reactance compensation, are disconnected either intentionally or due to a malfunction, to completely prevent the process of self-excitation.

This is accomplished according to the present invention in that a voltage monitor monitors the voltage fed, at the mains end, into a frequency converter, which basically comprises the series connection of a rectifier circuit, a d.c. intermediate circuit, and a controlled inverter circuit, and responds upon disconnection of the mains voltage on account of malfunction or for operational reasons; that if the mains voltage is disconnected, a capacitor of a buffer circuit disposed in the direct current intermediate circuit of the frequency converter transmits its stored energy with decaying voltage, via the inverter of the frequency converter, to the stator of the motor; and that if the voltage monitor responds, a device for quenching the residual magnetism of the rotor automatically increases the the output frequency $f_0$ of the inverter by a predetermined amount $\Delta f$.

In an exemplary embodiment of the invention, the voltage monitor controls a relay and a switch, via a collective malfunction indicator so that when the mains voltage drops or is missing altogether an auxiliary voltage source, which is connected with the rest or off contact of the switch, is connected, via a capacitor, to the control input of a voltage-frequency converter which functions as the clock pulse generator for controlling the inverter, and thus the signal present at the output of the voltage-frequency converter is increased in its frequency, which in operation corresponds to the number of revolutions of the motor, with respect to the operating frequency $f_0$ by a predetermined amount $\Delta f$.

The advantage realized with the present invention is that it is possible with simple means and with the use of the input frequency converter to realize and assure a significant increase in the operational dependability of systems operating with hysteresis motors even if the power supply is interrupted. In particular, this advantage is realized in that the effects of self-excitation, i.e., an increase in the motor terminal voltage to a multiple of the rated value and the occurrence of high reverse currents and rotor braking forces, are completely suppressed.

DETAILED DESCRIPTION OF THE PREFERRED EMBODIMENTS

Figure 1:
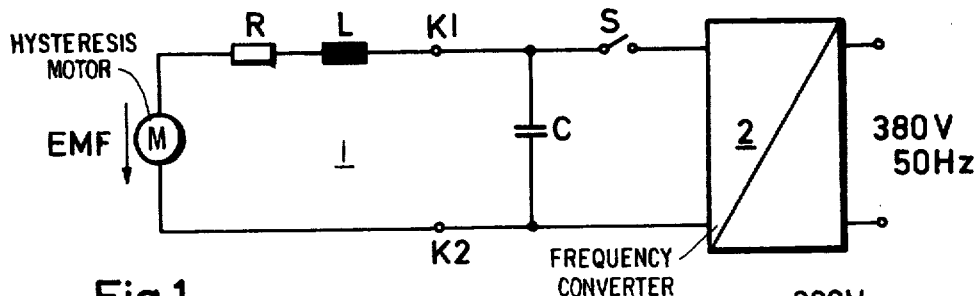
FIG. 1 is a basic circuit diagram for a hysteresis motor.

Referring now to FIG. 1, there is shown a single phase greatly simplified equivalent circuit diagram for a hysteresis motor M with a current supply device and in particular a frequency converter 2. The hysteresis motor M has a stator winding in which the permanent-magnet poles of the rotor induce an EMF as a counter voltage to the mains voltage present across terminals K1 and K2. An inductance L represents all stray and principal reactances, an effective resistance R represents the iron, copper and eddy current losses as well as the effective power transfer to the shaft during operation of the motor. A capacitor C whose capacitance at a predetermined operating frequency is of such a magnitude that its reactance is approximately of the same magnitude as the reactance of motor M is connected to terminals K1 and K2. The partial circuit to the left of terminals K1 and K2 forms a parallel resonant circuit 1 with capacitor C which is connected for reactance compensation, and closing of switch S connects this parallel resonant circuit with the output of the static frequency converter 2 used as a current supply. The disconnection of the power supply during operation as well as an interruption of the voltage supply due to malfunction can be simulated by opening of switch S. Upon opening of switch S, Motor M is driven by the inertial mass rotated by it during operation and acts as a generator while maintaining the EMF. The terminating impedance for the EMF is the series connection of R, L and C which now forms a weakly attenuated series resonant circuit. The generator current which is limited only slightly by the value of R produces greater magnetization of the rotor and thus an increase in the EMF which again drives a greater current through the series resonant circuit. This self excitation process causes the terminal voltage and the current to rise to four to five times their rated values within milliseconds.

Figure 2:
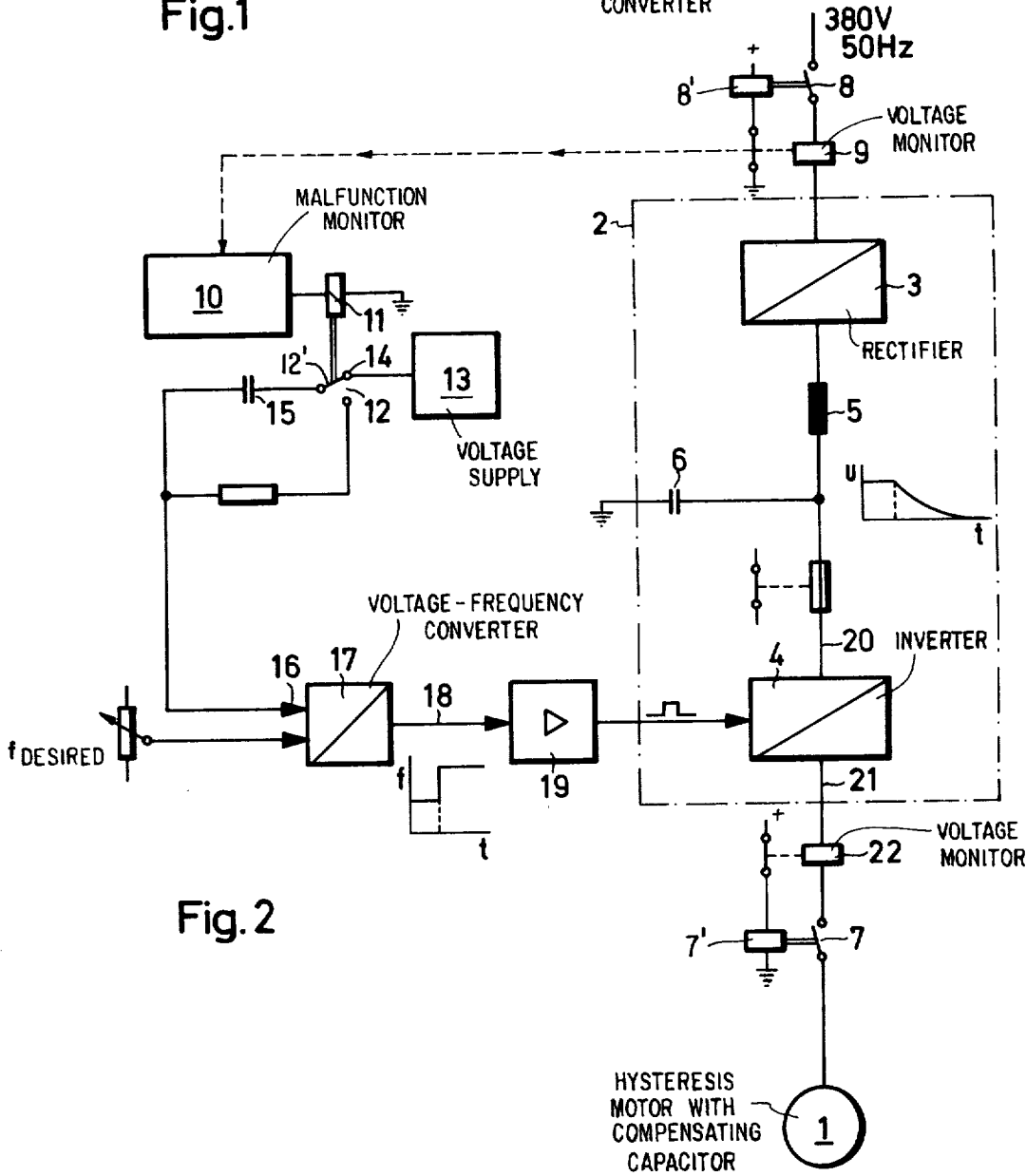
FIG. 2 is a block circuit diagram showing a hysteresis motor with automatic de-excitation circuit arrangement according to the invention.

The above described process of self-excitation can be completely suppressed in a simple manner with the circuit arrangement shown in FIG. 2. As shown in this figure the static frequency converter 2 substantially includes a rectifier 3 on the mains side, an inverter 4 on the load side and a d.c. intermediate circuit including a series connected smoothing choke 5 and a capacitor 6 as buffers for the intermediate circuit.

The mains voltage, e.g. 380V, 50Hz, is supplied to the input of the rectifier 3 via the switch contacts 8 of a relay 8' and a voltage monitor 9 which responds when the mains voltage is interrupted to open the switch 8. The output of the inverter 4 is connected via voltage monitor 22 and the switch contacts 7 of a relay 7' to the hysteresis motor 1. In a conventional manner, the control input of the inverter 4 is connected via an amplifier 19 to the output 18 of a voltage to frequency converter 17, which acts as a pulse generator. The voltage to frequency converter 17 normally receives an input signal whose voltage results in the production of output pulses at the desired operating frequency $f_0$ for the motor 1.

The voltage to frequency converter 17 is provided with a further input 16 which is connected via a capacitor 15 to the movable contact 12' of a switch 12. The position of the moveable contact 12' is controlled by a relay 11 which in turn is controlled by a collective malfunction indicator 10. The rest or off contact 14 of the switch 12, i.e., the contact connected to the moveable contact when the relay 11 is de-energized as illustrated, is connected to an auxiliary voltage source 13.

In synchronous standard operation of the motor 1, the stator and rotor fields operate at the rated frequency as determined by the output frequency of inverter 4, i.e., both fields are at rest relative to one another. When the motor is switched off, be it at the end of operation or because the mains is interrupted, it is not switch 7 connected to the output of frequency converter 2 which is opened but rather the mains side switch 8 at the input of the frequency converter 2. The voltage monitor 9 indicates interruption of the mains voltage to the collective malfunction indicator 10 which switches relay 11 to the illustrated position and thus moves the contact 12' of switch 12 to the illustrated position. Via the rest contact 14 of switch 12 and the capacitor 15, the output voltage of the auxiliary voltage source 13 is thus switched to the control input 16 of the voltage-frequency converter 17 so that the signal appearing at its output suddenly increases in frequency by an amount $\Delta f$. This output signal from output 18 is fed via a driver stage 19 to the control input of the inverter 4 of frequency converter 2 at whose input 20 appears an exponentially decaying voltage U caused by the discharging of capacitor 6 due to the interruption of the d.c. voltage at the output of rectifier 3. The stator of motor 1, which is connected to the output 21 of inverter 4, is thus fed with a three phase voltage whose frequency suddenly increases by about 10% compared to the normal operating frequency $f_0$. Now the stator field of motor 1 is oversynchronous with respect to the number of revolutions of the rotor which is being remagnetized by the difference frequency between the stator and the rotor fields. At the same time the amplitude of the alternating voltage offered to motor 1 at the output 21 of inverter 4 drops continuously, according to an e-function in dependence on the energy stored in capacitor 6 of the d.c. intermediate circuit, until it reaches zero. This constantly remagnetizes the rotor with a decreasing amplitude of field intensity and induction until the rotor is completely demagnetized.

During this process, which takes approximately 1 second, the control and regulating electronic system of the frequency converter 2 continues to be supplied with operating voltage. At the end of the de-excitation process the voltage monitor 22 opens load switch 7 and separates the motor 1 from the frequency converter 2.

Figure 3:
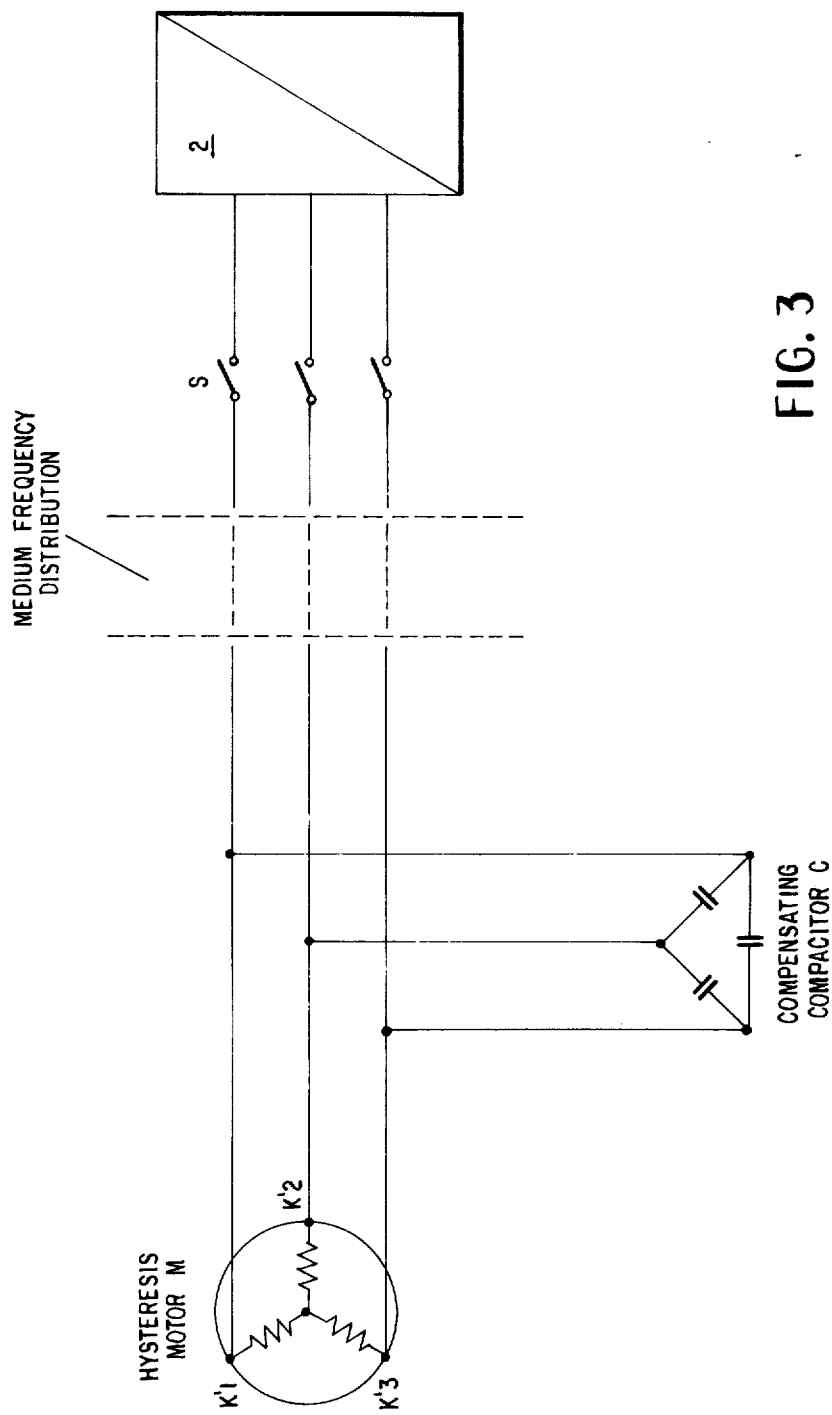
FIG. 3 is a circuit diagram showing the three phase connection of the motor M to the compensating capacitor C and the converter 2.

FIG. 3 corresponds in principle to FIG. 1, but the drawing takes regard to the three phase arrangement. The windings of the stator M are star-connected and their ends connected to the motor terminals K'1, K'2 and K'3. In parallel to these terminals a three phase compensating capacitor C is placed. This arrangement is connected via a distribution and the switch S to the converter 2.

It will be understood that the above description of the present invention is susceptible to various modifications, changes and adaptations, and the same are intended to be comprehended within the meaning and range of equivalents of the appended claims.

What is claimed is:

1. In a circuit arrangement including a hysteresis motor having a ferromagnetic rotor and a three phase stator winding, capacitors connected to said stator windings for providing compensation for the reactive power intake of said motor, and a static frequency converter including the series connection of a rectifier circuit, a d.c. intermediate circuit and a controlled inverter circuit, said static frequency converter having its input connected to a three phase mains and its output connected to said stator windings for supplying power to said motor whereby the rotating field produced by the stator windings magnetizes said rotor and thus produces a permanently magnetic excitation which continues in said rotor, even after disconnection of said motor from said three phase mains, in the form of residual magnetic poles; the improvement comprising circuit means for the automatic de-excitation of said motor, said circuit means comprising in combination: voltage monitoring means for monitoring the voltage of said mains at the input of said frequency converter and for producing an output signal indicative of an interruption in the mains voltage due to malfunction or end of operation; a buffer circuit for said d.c. intermediate circuit of said static frequency converter, said buffer circuit including a storage capacitor which is connected to the input of said controlled inverter circuit and which discharges and transfers its stored energy with decaying voltage to said stator windings of said motor via said controlled inverter circuit when the output voltage of said rectifier is interrupted; and means responsive to said output signal from said voltage monitoring means for automatically increasing the output frequency $f_0$ of said inverter circuit by a predetermined amount $\Delta f$, whereby the residual magnetism in the rotor is quenched.

2. The circuit arrangement defined in claim 1 wherein said buffer circuit includes a choke coil connected between the output of said rectifier and the input of said inverter, and said storage capacitor, which is connected between said input of said inverter circuit and ground.

3. The circuit arrangement defined in claim 1 wherein said inverter circuit has a control input for receipt of a series of clock pulses for controlling the output frequency of said inverter circuit; and wherein said circuit arrangement further comprises means for normally supplying a series of clock pulses of a frequency $f_0$, which during operation corresponds to the number of revolutions of said motor, to said control input of said inverter circuit.

4. The circuit arrangement as defined in claim 3 wherein: said clock pulse supplying means is a voltage to frequency converter; and said means for automatically increasing the output frequency of said inverter comprises: an auxiliary voltage source; a switch having at least first and second contacts, said voltage source being connected to said first contact; a capacitor being connected between said second contact and a control input of said voltage to frequency converter; a relay for controlling said switch; and means, responsive to said output signal from said voltage monitoring means, for causing said relay to connect said first and second switch contacts, whereby said auxiliary voltage source is connected, via said capacitor connected to said second contact, to said control input of said voltage to frequency converter to increase the output frequency thereof, and thus the output frequency of said inverter circuit, by said predetermined amount $\Delta f$ with respect to said operating frequency $f_0$.

* * * * *